Figure 4:
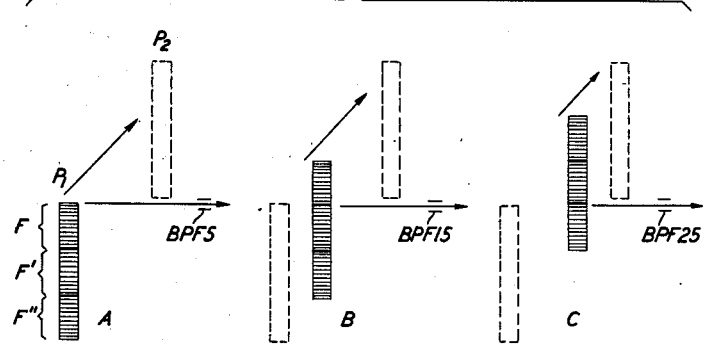

Oct. 11, 1949.  H. J. FISHER  2,484,618
WAVE RECEIVING SYSTEM
Filed Aug. 26, 1944  2 Sheets-Sheet 1
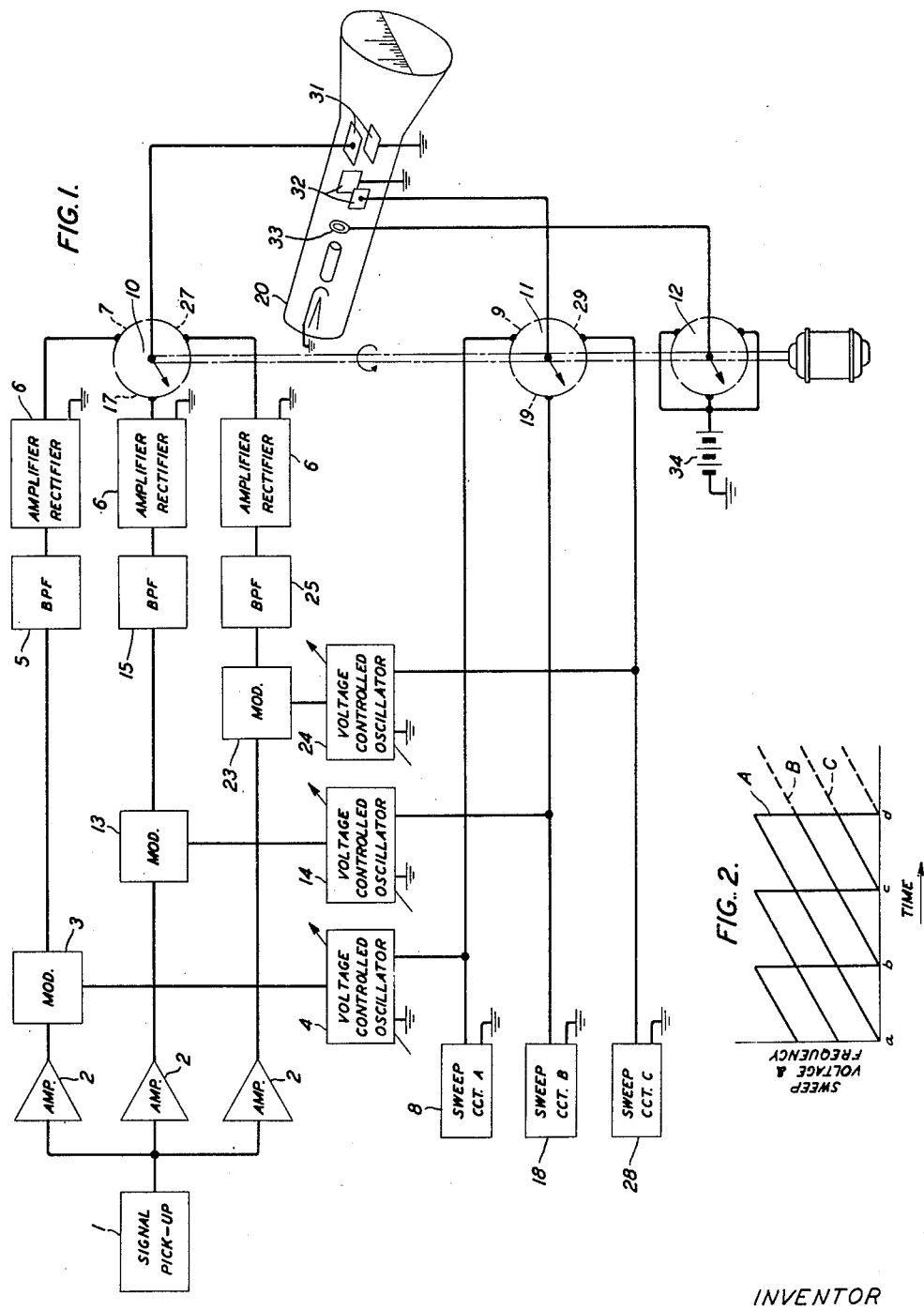
INVENTOR
H. J. FISHER
BY
ATTORNEY Oct. 11, 1949.  H. J. FISHER  2,484,618
WAVE RECEIVING SYSTEM
Filed Aug. 26, 1944  2 Sheets-Sheet 2

INVENTOR
H. J. FISHER
BY
*N. D. Ewing*
ATTORNEY

Patented Oct. 11, 1949

2,484,618

UNITED STATES PATENT OFFICE 2,484,618

WAVE RECEIVING SYSTEM

Harold J. Fisher, Port Washington, N. Y., assignor to Bell Telephone Laboratories, Incorporated, New York, N. Y., a corporation of New York Application August 26, 1944, Serial No. 551,361

8 Claims. (Cl. 175—183)

This invention relates primarily to frequency range scanning and oscilloscopic systems and more particularly, although in its broader aspects not exclusively, to frequency range scanning systems for the simultaneous oscilloscopic display of wave activity appearing at different frequencies within a wide frequency range.

An illustrative system of the kind described is one comprising a monitoring receiver adapted to detect under-water sound waves and to indicate simultaneously on an oscilloscope the respective frequencies of all of the waves or "signals," that appear. Such a system may comprise frequency selective means for repeatedly scanning the frequency range of interest and a cathode ray oscilloscope to which are applied the wave effects of different frequencies that are successively encountered during each scanning cycle.

One of the objects of the present invention is to improve the frequency resolution of a frequency range scanning system. A related object is to increase the amount of collected information that can be effectively utilized in a scanning system without impairing the resolution.

In accordance with the present invention, as embodied in a frequency range scanning system hereinafter to be described in detail, a plurality of frequency selective scanning means are caused to operate simultaneously in the frequency range of interest, and the formation collected thereby regarding the frequencies of the different signals that may be present in the signal band is commutatively applied to the utilization means, an oscilloscope. More particularly, the several scanning means are arranged to operate over respective different subdivisions of the signal band during each of a regular succession of time intervals and they are operatively connected to a common output circuit one after another in rapidly repeated succession. During each such time interval all of the different signals appearing in the band are admitted momentarily and in succession to the output circuit so that the latter receives a succession of signal pulses which by their relative time displacement afford a frequency analysis of the entire band. Each such frequency analysis is completed in a fraction of the time that would be required by a single scanning means operating at the same scanning rate yet there is no corresponding increase in distortion due to build-up time limitations of the frequency selective elements.

In accordance with the invention, further, the frequency analyzer comprises a plurality of separate frequency selective elements, or filters, each of which is continuously connected to receive the wave output of a signal translating device that is adapted to transport the received signal band to any desired different position in the frequency spectrum and that operates to shift the signal band cylically relative to the pass-frequency of the connected filter. The respective pass-frequencies of the several filters are so chosen with reference to the frequency shift of the signal band applied thereto that at a given time the different filters selectively transmit signals from corresponding different subdivisions of the signal band. In the embodiment herein disclosed this relation is brought about by assigning all of the filters the same pass-frequency and maintaining the shifting signal bands applied to the different filters in displaced relation to each other so that as a given sub-band is scanned by one filter each other sub-band is simultaneously scanned by another filter. In an improved embodiment disclosed and claimed in the copending application of E. I. Green, Serial No. 540,763, filed June 17, 1944, the same relation is brought about by maintaining the shifting signal bands applied to the different filters in undisplaced relation to each other and by assigning widely different pass-frequencies to the different filters.

The frequency analysis of the signal band that is effected in the foregoing manner can be translated into visual form by an oscilloscopic system in which the signal pulses modulate the ray in distinctive manner while the ray is continually deflected along an axis to predetermined different positions such that the axis serves as a frequency scale. In the specific embodiment disclosed herein the deflection of the ray along the frequency axis is controlled in alternation by a plurality of sweep circuits each of which controls also the frequency shift of the signal band applied to a respectively corresponding filter. This embodiment will be described with reference to the accompanying drawings, in which:

Fig. 1 is a diagrammatic representation of a frequency range scanning and display system in accordance with the invention; and Figs. 2 to 5 illustrate the operation of certain of its components.

Referring more particularly now to Fig. 1 the scanning system therein shown may be, for specific example, a submarine signal detection and monitoring system, and it will be so described.

Signal pick-up 1 includes the necessary equipment for intercepting and converting into equivalent electrical wave form all of the submarine sound waves that lie within the frequency range of interest, which may embrace audio or supersonic frequencies or both. As will be explained in detail, each received signal of different frequency produces on the screen of a cathode ray tube 20 a luminous mark the position of which along a reference axis indicates the frequency of the particular signal. The nature of the circuit organization is such that all of the signals received at any time appear to be simultaneously and continuously displayed, so that the operator or monitor can be always informed of at least the presence and the frequency of all intercepted signals.

The output circuit of the signal pick-up device 1 is connected to three transmission paths that constitute substantially identical frequency scanners. Each path includes a wave amplifier 2 through which all waves within the monitored frequency range are simultaneously applied to a modulator 3, 13 or 23, and a band-pass filter 5, 15 or 25, that is connected to the output circuit of the associated modulator.

The three filters have the same transmission characteristics; their pass-frequencies are alike.

Beating oscillations are supplied to each modulator 3, 13, 23, from an individual oscillator 4, 14 or 24, the operating frequency of which is cyclically varied between predetermined limits, the same for all three, under the control of a saw-toothed voltage wave that is generated by a respective sweep circuit 8, 18 or 28. The three saw-toothed waves should have exactly the same periodicity and the same amplitude limits; and their generators may be locked in isochronism with each other by any suitable means.

The limiting frequencies of the beating oscillators 4, 14, 24 are so chosen with reference to the pass-frequency of the filters 5, 15, 25, that one of the sidebands derived from the wave frequency band applied to the modulators is repeatedly swept, from one extremity to the other, across the pass-frequency of the filters. Each of the latter is assigned a narrow pass band such that it is capable of selectively passing the signals of different frequencies that appear in the applied sideband. In effect, each of the frequency selective devices 5, 15, 25, cyclically traverses or scans the frequency range of interest and during each traverse passes, momentarily and successively, the waves of different frequencies that are successively encountered. The repetitive rate of scanning may be, for example, of the order of 15 cycles per second as determined by the operating frequency of the sweep circuits.

Whereas the three frequency range scanners are alike in all of the respects described they differ with respect to the relative phases of the three saw-toothed voltage waves. As illustrated in Fig. 2 the three voltage waves A, B and C, are made to differ in phase by one-third of a cycle or 120 electrical degrees. As a result of this phase difference the three frequency range scanners are likewise displaced in phase, and at every instant the respective frequencies selected by them are separated from each other by one-third of the width of the sideband or monitored frequency range. Thus, referring again to Fig. 2, the frequency range scanner associated with voltage wave A may at an instant of time $a$ begin its traverse across the frequency range, at a linear rate as represented by curve A, and reach the upper extremity of the frequency range at a time $d$, while the other two scanners begin their traverse at instants $b$ and $c$ that are successively later by one-third and two-thirds, respectively, of the scanning period. It will be noted that during each of the three intervals, such as $cd$, the three scanners are operative in respectively different thirds of the frequency range. In summary, then, the three channels through which the picked up signals pass have the same characteristics except for the phase difference in their operation brought about by the phase difference in the corresponding three sweep wave generators controlling the respective voltage-controlled oscillators.

Figure 3:
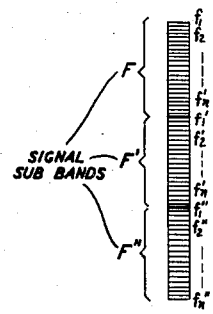

Fig. 3 illustrates diagrammatically the signal band (assumed to be the lower sideband) and its component thirds or sub-bands F, F' and F'' together with representative progressively higher frequencies $f_1, f_2 \ldots f_n, f_1', f_2' \ldots f_n', f_1'', f_2'' \ldots f_n''$, therein at which signals may appear. Fig. 4 illustrates diagrammatically the progressive shift in the frequency position of the signal band from one extreme position $P_1$ to the other extreme position $P_2$, and also the relative pass-frequencies of the filters. Fig. 4 further illustrates how the signal band applied to each filter is displaced from the signal band applied to each other filter.

The output circuits of the several filters 5, 15, 25, are connected to respective amplifier-rectifiers 6 (each comprising a conventional amplifier followed by a rectifier) which in turn are connected to respectively corresponding segments 7, 17 and 27 of a commutator 10. Through the rotary contactor of the latter, signal-produced unidirectional voltages derived from the devices 6 are applied to deflecting plates 31 of the cathode ray tube 20. The deflecting plates 31 are so oriented that the unidirectional voltage applied to them controls deflection of the cathode ray in the vertical plane. Hence, whenever the connected scanner encounters a signal the luminous spot produced by the ray is momentarily displaced vertically across the screen, leaving a luminous line trace the length of which is more or less proportional to the strength of the signal.

Deflection of the cathode ray in the horizontal plane is controlled by voltages applied to deflecting plates 32. These voltages are derived from the three sweep circuits 8, 18 and 28 through a commutator 11, the latter comprising segments 9, 19 and 29 and a rotary contactor that is driven in synchronism with commutator 10. The horizontal line or reference axis that is traversed by the luminous spot under the influence of the commutated saw-toothed waves constitutes a continuously scaled frequency axis, and analysis will show that when waves of any given frequency are encountered by the connected scanner the spot is always positioned at the corresponding point along the frequency scale. A third synchronously operated commutator 12 applies to cathode ray control electrode 33 a biasing voltage derived from battery 34 such that the luminous spot is substantially extinguished while the commutators 10 and 11 pass from one segment to another. The three commutators are operated at a high periodic rate that is many times greater than the periodic rate, or frequency, of the saw-toothed voltage waves.

Figure 5:
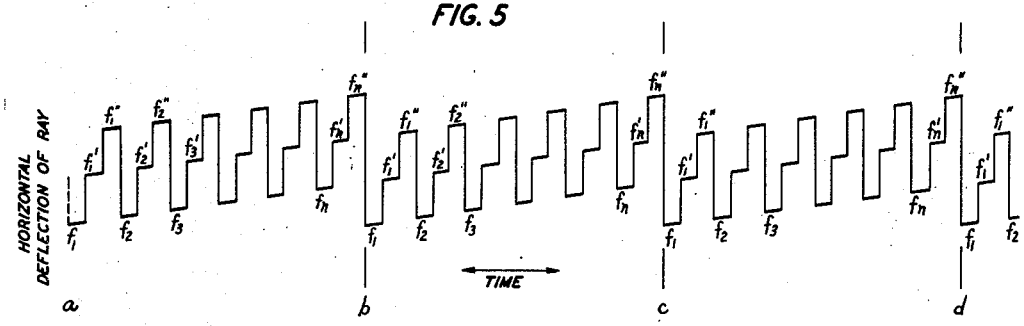

Fig. 5 illustrates diagrammatically the movement along the frequency axis that the cathode ray executes during each scanning period $ad$ under the control of the applied sweep voltages.

In considering the operation of the Fig. 1 system one may take as starting point the instant of time $a$ when the saw-toothed voltage wave A is at its minimum value and its associated scanner is at, say, the lower extremity of the signal frequency range. At this instant, it may be assumed, the contactors associated with commutators 10 and 11 have just made contact with segments 7 and 9 respectively. During the brief period that these segments are connected to the cathode ray tube, voltage wave A controls the position of the spot along the frequency scale on the screen, and it causes the spot to progress to the right from the extreme left-hand or low frequency end of the reference axis. This displacement is represented by the slanting line $(f_1)$ at the left-hand extremity of Fig. 5. If a signal, having a frequency of approximately $f_1$, is encountered by the connected scanner during this brief period the rectified signal voltage supplied through segment 7 deflects the cathode ray upwardly leaving a vertical line trace. During the next brief period $(f_1')$, while commutator segments 17 and 19 are connected to the cathode ray tube, voltage wave B deflects the luminous spot to a point substantially one-third the length of the reference axis from the left-hand extremity thereof and moves it progressively to the right from that point. During this period the associated scanner registers any signals that are encountered in the lower part of the middle third of the frequency range, i. e., signals having a frequency approximating $f_1'$. Similarly, while the commutators 10 and 11 traverse the third set of segments the scanner associated with sweep circuit 28 scans a narrow band in the vicinity of frequency $f_1''$, which is in the lower part of the upper third of the signal frequency range, and any signals encountered by it are registered at the proper points along the frequency scale. This process is repeated many times before the point $b$ is reached at which time the three frequency scanners have together covered the entire signal frequency range and all of the signals encountered have produced respectively corresponding luminous marks along the frequency axis. The rate of repetition is rapid enough in relation to the band width of the filters and the rate at which the frequency scanners progress through the frequency range that each detected signal is applied to the cathode ray tube at least once during the period $ab$ notwithstanding the fact that each scanner is connected to the cathode ray tube only one-third of the time.

During the second and third portions $bc$ and $cd$ of the scanning cycle the operations described above are repeated except that the several frequency scanners operate in different thirds of the frequency spectrum and their associated sweep circuits deflect the cathode ray spot to correspondingly different thirds of the frequency axis.

Each of the three selective wave receiving branches in Fig. 1 will be recognized as being closely related to the ordinary heterodyne radio receiver, for the frequency to which each such branch is tuned is dependent on the frequency of the oscillations supplied from a beating oscillator. As in the conventional heterodyne type of scanning receiver the frequency of the beating oscillations is varied cyclically, thereby causing the tuning of the receiving branch to progress from one end of the tuning range to the other, repeatedly. All of the elements in each such receiving branch are well known to those skilled in the art, as evidenced by such prior patents as O. H. Schuck, Jr., No. 1,994,232; E. P. Felch, Jr., No. 2,254,601; S. Y. White, No. 2,283,523; W. H. Bliss, No. 2,409,012; and T. L. Dimond, No. 2,414,096.

It will be noted that whereas the period of each frequency scanner is equal to the time interval $cd$, the combination of scanners covers the entire frequency range in one-third of this time. This fact has important corollaries. Although it might be supposed that the frequency resolution of a single frequency scanner could be indefinitely improved by reducing the width of the pass-band of the filter it is found that such is not the case and that distortion effects arise within the filter if the pass-band is made less than a certain amount depending on the type of filter and the scanning rate as measured in cycles per second. For similar reasons it is found that the scanning rate cannot be indefinitely increased beyond a certain rate depending on the particular filter. This effect is due in part to the finite time required for a signal pulse to build up to full value within the filter. Frequency resolution could be improved by reducing both the scanning rate and the width of the filter pass-band, but any reduction in the scanning rate increases the possibility of missing signals of intermittent character or short duration and increases the tendency of the luminous signal indications on the oscilloscope to flicker.

In view of the foregoing considerations it will be appreciated that the present invention as embodied in the multiple scanning system of Fig. 1 permits a substantial decrease in the width of the pass-band of the filters 5, 15 and 25 and a corresponding increase in frequency resolution while maintaining at a given value the repetitive rate at which the entire frequency range is scanned. Alternatively, the inherent advantage of the system may be utilized to increase the extent of the scanned frequency range while maintaining a given degree of frequency resolution. It will be understood, too, that three frequency scanners have been shown only for purposes of illustration and that the invention may be embodied in systems comprising any number of scanners. The invention is susceptible of embodiment in other and widely varying forms within the spirit and scope of the appended claims.

What is claimed is:

1. A system for determining the relative frequencies of signals appearing in a signal band comprising input circuit means for receiving the said signal band, a multiplicity of distinct transmission paths each including a frequency selective device adapted to selectively transmit waves of a predetermined frequency, wave translating means electrically connected between said input circuit means and the several said frequency selective devices for simultaneously applying the said signal band to each said frequency selective device, said translating means including modulating means for cyclically shifting, at the same cyclical rate and between predetermined limits, the frequency position of the signal band so applied to each said frequency selective device whereby each said device selectively transmits momentarily and in cyclically repeated succession signals of different relative frequency appearing in the shifting band applied thereto, the different frequency selective devices having their respective transmission frequencies so fixed in relation to the cyclical shifting of the band applied to each that signals from corresponding different subdivisions of the signal band are simultaneously transmissable thereby, a common output circuit, means for applying to said output circuit signal-derived energy pulses resulting from the momentary transmission of signals by said selective devices including switching means connecting said transmission paths in repeated succession to said output circuit at a rate of repetition that is many times the cyclical rate of shifting of said signal band, and indicating means connected to said output circuit and continuously responsive to the signal-derived pulses therein for indicating the relative frequencies of the signals from which said pulses are derived.

2. A system in accordance with claim 1 in which the respective transmission frequencies of said frequency selective devices are alike and in which said modulating means is adapted to maintain the cyclically shifting band as applied to each said device in phase displaced relation with the cyclically shifting band as applied to each other of said devices.

3. A system for determining the relative frequencies of signals appearing in a signal band comprising input circuit means for receiving the said signal band, a multiplicity of distinct transmission paths each including a frequency selective device adapted to selectively transmit waves of a predetermined frequency, wave translating means electrically connected between said input circuit means and the several said frequency selective devices for simultaneously applying the said signal band to each said frequency selective device, said translating means including modulating means for cyclically shifting, at the same cyclical rate and between predetermined limits, the frequency position of the signal band so applied to each said frequency selective device whereby each said device selectively transmits momentarily and in cyclically repeated succession signals of different relative frequency appearing in the shifting band applied thereto, the different frequency selective devices having their respective transmission frequencies so fixed in relation to the cyclical shifting of the band applied to each that signals from corresponding different subdivisions of the signal band are simultaneously transmissible thereby, a common output circuit, means for applying to said output circuit signal-derived energy pulses resulting from the momentary transmission of signals by said selective devices including switching means connecting said transmission paths in repeated succession to said output circuit at a rate of repetition that is many times the cyclical rate of shifting of said signal band, and means comprising a cathode ray oscilloscope for visually marking along a reference axis the presence and relative frequencies of the received signals, said oscilloscope including ray controlling means connected to said output circuit and continually responsive to said energy pulses for marking the appearance of each said energy pulse therein and ray reflecting means for simultaneously deflecting the ray in cyclically repeated succession to preassigned different positions along said reference axis such that the relative position of said ray along said axis corresponds at each instant to the relative frequency of the signal that is transmissible through the particular transmission path then connected to said output circuit.

4. A frequency analyzing system comprising wave receiving means adapted to transmit a predetermined band of received waves, a multiplicity of distinct transmission paths each including a frequency selective device adapted to selectively transmit waves of a predetermined frequency, wave translating means interposed between said receiving means and the several said frequency selective devices for applying the said band of waves to each said frequency selective device, said last-mentioned means including modulating means for cyclically shifting, at the same cyclical rate and between predetermined limits, the frequency position of the band of waves so applied to each said frequency selective device, the different frequency selective devices having their respective transmission frequencies so fixed in relation to the cyclical shifting of the band applied to each as to transmit simultaneously waves from corresponding different widely separated parts of the said band, a common output transmission path, means connecting said multiplicity of paths in repeated succession to said output path at a cyclical rate many times the cyclical rate at which the frequency position of said band is shifted, and a utilization device connected to said common output transmission path.

5. A frequency analyzing system comprising wave receiving means adapted to transmit a predetermined band of received waves, a multiplicity of distinct transmission paths each including a frequency selective device adapted to selectively transmit waves of a predetermined frequency, wave translating means interposed between said receiving means and the several said frequency selective devices for applying the said band of waves to each said frequency selective device, said last-mentioned means including modulating means for cyclically shifting, at the same cyclical rate and between predetermined limits, the frequency position of the band of waves so applied to each said frequency selective device, the different frequency selective devices having their respective transmission frequencies so fixed in relation to the cyclical shifting of the band applied to each as to transmit simultaneously waves from corresponding different widely separated parts of the said band, a common output transmission path, means connecting said multiplicity of paths in repeated succession to said output path at a cyclical rate many times the cyclical rate at which the frequency position of said band is shifted, a utilization device connected to said common output transmission path, said utilization device comprising an oscilloscope including ray-forming means, means connected to said common output path for modifying the ray under the control of the successively different waves transmitted by said frequency selective devices to mark the presence of the said waves in the received band, and means for moving said ray cyclically to successively different preassigned positions along a reference axis such that the position of the ray along the reference axis at each moment corresponds to the relative position in the received band of any wave controlling the aforesaid modification of the ray at that moment.

6. A frequency analyzing system comprising wave receiving means adapted to transmit a predetermined band of received waves, a multiplicity of distinct transmission paths each including a frequency selective device adapted to selectively transmit waves of a predetermined frequency, wave translating means interposed between said receiving means and the several said frequency selective devices for applying the said band of waves to each said frequency selective device, said last-mentioned means including individual modulating means in the several transmission paths for cyclically shifting the frequency position of the band of waves so applied to each said frequency selective device at the same cyclical rate in each path and with a difference from one path to another in the phase of the cyclical shifting of the band, the different frequency selective devices having their respective transmission frequencies alike whereby they are adapted to transmit simultaneously waves from corresponding different widely separated parts of the said band, a common output transmission path, means for connecting said multiplicity of paths in repeated succession to said output path at a cyclical rate many times the cyclical rate at which the frequency position of said band is shifted, a utilization device connected to said common output transmission path, said utilization device comprising an oscilloscope including ray-forming means, means connected to said common output path for modifying the ray under the control of the successively different waves transmitted by said frequency selective devices to mark the presence of the said waves in the received band, and means for moving said ray cyclically to successively different preassigned positions along a reference axis such that the position of the ray along the reference axis at each moment corresponds to the relative position in the received band of any wave controlling the aforesaid modification of the ray at that moment.

7. A frequency range scanning system comprising a signal receiver having a multiplicity of tunable frequency selective branches to which the received signals are concurrently applied, means for varying the tuning of each of said branches cyclically over a predetermined frequency range including means maintaining the cyclical variations in the tuning of the several branches in isochronism with each other and relatively displaced in phase whereby said branches are continually tuned to selectively transmit signals from separated parts of the frequency range simultaneously, a common output circuit, means for delivering pulses derived from the selected signals to said common output circuit including switching means connecting the several said branches to said output circuit in repeated succession at a cyclical rate many times greater than the cyclical rate at which the tuning of said branches is varied, a cathode ray oscilloscope, and means for visually indicating on said oscilloscope the relative frequencies of the selected signals, said last-mentioned means including ray controlling means connected to said common output circuit and responsive to the signal-derived pulses appearing therein, and means for simultaneously deflecting said ray along a reference axis to predetermined different positions in such timed relation that upon the appearance of any said signal-derived pulse the relative position of said ray along said axis corresponds to the relative frequency of the signal from which the said pulse is derived.

8. A frequency range scanning system comprising a signal receiver adapted to transmit received signals lying within a wide frequency band, a multiplicity of branch transmission paths each connected at one end to receive signals from said receiver and each including a modulator followed by a frequency selective device, said devices having respective transmission frequencies that are alike, a plurality of voltage-controlled variable-frequency oscillators each connected to supply beating oscillations to a corresponding one of said modulators, a plurality of generators connected to supply to corresponding ones of said oscillators saw-toothed frequency-controlling voltage waves of the same periodicity and of different relative phase, a cathode ray tube including a voltage-responsive ray deflector and a ray modifier, switching means for connecting said generators to said ray deflector in repeated succession at a rate of repetition many times as great as the frequency of said saw-toothed voltage waves, and switching means for connecting said transmission paths at their other ends to said ray modifier in repeated succession in synchronism with the connection of said generators to said ray deflector.

HAROLD J. FISHER.

REFERENCES CITED

The following references are of record in the file of this patent:

UNITED STATES PATENTS

| Number | Name | Date |
| --- | --- | --- |
| Re. 22,672 | Shumard | Aug. 28, 1945 |
| 1,976,481 | Castner | Oct. 9, 1934 |
| 1,994,232 | Schuck, Jr. | Mar. 12, 1935 |
| 2,159,790 | Freystedt et al. | May 23, 1939 |
| 2,221,115 | Shepard, Jr. | Nov. 12, 1940 |
| 2,312,761 | Hershberger | Mar. 2, 1943 |